(12) United States Patent
Bell et al.

(10) Patent No.: US 6,629,776 B2
(45) Date of Patent: Oct. 7, 2003

(54) DIGITAL SENSOR FOR MINIATURE MEDICAL THERMOMETER, AND BODY TEMPERATURE MONITOR

(75) Inventors: Florian G. Bell, Bend, OR (US);
Donna K. Barton, Bend, OR (US);
Jesse S. Laird, Bend, OR (US);
Christopher T. Jones, Bend, OR (US)

(73) Assignee: Mini-Mitter Company, Inc., Bend, OR (US)

( * ) Notice: Subject to any disclaimer, the term of this patent is extended or adjusted under 35 U.S.C. 154(b) by 0 days.

(21) Appl. No.: 10/017,098

(22) Filed: Dec. 12, 2001

(65) Prior Publication Data

US 2002/0105436 A1 Aug. 8, 2002

Related U.S. Application Data

(60) Provisional application No. 60/254,879, filed on Dec. 12, 2000.

(51) Int. Cl.$^7$ .............. G01K 7/34; G01K 7/16; G08C 19/18; G08C 19/16; G08C 19/04; A61B 5/00
(52) U.S. Cl. .......... 374/170; 374/183; 340/870.17; 340/870.19; 340/870.05; 340/539; 600/300
(58) Field of Search ............... 374/183, 170; 340/870.17, 870.05, 870.19, 870.24, 539, 870.37, 855.4; 600/300, 549

(56) References Cited

U.S. PATENT DOCUMENTS

| 5,036,538 A | * | 7/1991 | Oken et al. ............ 381/43 |
| 5,397,083 A | * | 3/1995 | Thomas ............... 246/121 |
| 6,014,430 A | * | 1/2000 | Gosney et al. ........ 379/93.12 |
| 6,115,647 A | * | 9/2000 | Carli et al. .......... 700/194 |
| 6,128,601 A | * | 10/2000 | Van Horne et al. ...... 705/34 |
| 6,201,975 B1 | * | 3/2001 | Isberg et al. ......... 455/557 |
| 6,212,401 B1 | * | 4/2001 | Ackley ............... 455/556 |
| 2002/0107557 A1 | * | 8/2002 | Edell et al. .......... 607/60 |
| 2002/0161290 A1 | * | 10/2002 | Chance .............. 600/32 |

FOREIGN PATENT DOCUMENTS

JP            11275063         * 10/1999 ............. H04L/1/22

* cited by examiner

Primary Examiner—Christopher W. Fulton
Assistant Examiner—Gail Verbitsky
(74) Attorney, Agent, or Firm—John Smith-Hill; Smith-Hill and Bedell

(57) ABSTRACT

A thermometer is disclosed that utilizes a thermistor as a temperature sensor, to control the period and duty cycle of a multivibrator circuit. A second circuit, controlled by a microcontroller, measures both the charge and discharge times of the oscillation. From the ratio of these parameters, a precise indication of temperature can be obtained that is independent of temperature variations within the active components and the charging capacitor of the multivibrator circuit. The method is also independent of the value of the charging capacitor. Furthermore, by measuring the same ratio when a fixed resistor is substituted for the thermistor, a cell constant can be derived. The cell constant is used to calibrate the non-ideal response of the multivibrator circuit, thus providing a more accurate measurement of temperature.

35 Claims, 4 Drawing Sheets

DIGITAL SENSOR FOR MINIATURE MEDICAL THERMOMETER, AND BODY TEMPERATURE MONITOR

CROSS-REFERENCE TO RELATED APPLICATION

This application claims benefit of Provisional Application No. 60/254,879 filed Dec. 12, 2000.

BACKGROUND OF THE INVENTION

In a first aspect, the present invention relates to an electronic thermometer and more particularly, but not exclusively, to a thermometer useful for measuring body temperature of human or animal subjects or for measuring ambient temperature. In a second aspect, the present invention relates to a telemetry system consisting of a transmitting measurement device (preferably a body temperature thermometer) and a portable receiving unit which displays the measured value of a sensed parameter.

Several prior art inventions utilize a temperature-dependent resistive element together with an oscillator circuit to form a digital thermometer. In the prior art, a thermistor is sometimes used as a temperature-dependent, variable-resistance device in series with a charging capacitor to form the frequency-controlling elements of the oscillator network. The equation $$f = \frac{1}{(2\pi RC)}$$

determines the frequency of oscillation, where R is the resistance of the resistive element (thermistor) and C is the capacitance of the series charging capacitor. As the temperature varies, the resistance of the thermistor varies, and the frequency varies as a result. By measuring the frequency, and knowing the value of the capacitance, the value of R can be determined. Because R is uniquely related to temperature, the temperature can be determined as well. For a thermistor, the resistance is related to the temperature via the Steinhart-Hart equation. The use of a multivibrator as the oscillator circuit is disclosed in U.S. Pat. No. 4,359,285 by Washburn for low-power oceanographic applications. U.S. Pat. Nos. 4,602,871 and 4,464,067 issued to Hanaoka disclose thermometers based on thermistor-controlled oscillators whose properties emphasize miniaturization, light weight, and improved accuracy using correcting circuits. These latter two patents refer to applications wherein the sensor may be used with low-power wristwatch devices.

One disadvantage of measuring the frequency of the oscillator is that one must know the value of the capacitor extremely accurately in order to derive the value of the resistance accurately. Generally, it is difficult to do capacitance measurements accurately, and in addition, the capacitance value is known to be a temperature-dependent parameter. The capacitance can increase or decrease with changing temperature and the degree of change is related to the exact type of material used in the capacitor (Y5V, X7R, NPO, etc.). A further disadvantage of this approach is that the active circuit elements in the oscillator circuit can themselves have temperature-dependencies. These dependencies are nearly impossible to predict and may vary from circuit to circuit.

Some prior arts attempt to reduce the undesirable temperature dependencies by way of calibration techniques. As an example of prior art, U.S. Pat. No. 4,150,573 discloses the use of a thermistor to control a pulse oscillator circuit. In that patent, the pulse oscillator input is switched between the thermistor and a fixed resistor. A ratio is formed between the frequency produced by the thermistor and the frequency produced by the fixed resistor. This ratio divides out uncertainties associated with circuit component values and power supply variations. This provides the advantage of reducing the need for high accuracy parts and reduces the effects of power supply variations. However, this concept is unnecessarily complicated and it does not accurately measure the non-ideal behavior of the oscillator circuit nor does it null out temperature dependencies in the active components of the oscillator circuit. This concept may also introduce errors due to the temperature variations in the switching device.

For a medical thermometer, or other applications where extreme accuracy is required (less than 0.05 degrees C. uncertainty), the errors introduced by capacitance variation and by active circuit element variation cannot be tolerated. A method is needed that reduces these effects to a level of less than 0.01 degrees C. In addition, for a low-power application such as a miniature ingestible temperature sensor, it is not possible to use sophisticated, computer-controlled correction techniques, because the thermometer must be miniature, and is expected to be powered from a 1.5 volt battery source or a 3.0 volt battery source.

At present there are ingestible temperature responsive transmitters or ingestible temperature monitoring pills available. U.S. Pat. No. 4,689,621 issued to Kleinberg, and U.S. Pat. No. 4,844,076 issued to Lesho et al describe temperature responsive transmitters for use in ingestible capsules. Both devices disclosed employ crystal-controlled oscillators which transmit continuously on a single frequency determined by the temperature of the device. Lesho et al. also discloses a receiver employing a frequency counter to determine the frequency of the transmitter, and perform the calculation to determine the temperature sensed by the pill.

However, both of these devices have severe application limitations as they are purely analog devices, continuously transmitting on a single frequency. This prevents the use of multiple devices on a single subject, or on subjects in close proximity to each other because the signals from individual devices interfere with each other and cannot be distinguished. In addition, the prior art uses the temperature characteristics of a crystal to vary the oscillation frequency of the transmitter, requiring a frequency counter or other coherent detector in the receiver to determine the absolute frequency, and hence, the temperature. Use of a crystal to determine the oscillation frequency also requires an extensive calibration procedure, and requires the user of the device to input those calibration values into the receiver prior to use.

To prevent the batteries used in the ingestible capsule from being drained during storage, the prior art places a magnetic reed switch between the battery and the circuitry. Consequently, the device must be stored with a magnet in close proximity to keep the device de-activated, or it must use a rechargeable battery, and a recharger as disclosed in Lesho et al.

SUMMARY OF THE INVENTION

The basis of the invention in a first aspect is a circuit containing a temperature-dependent resistive element that controls the charge and discharge times of a multivibrator. By measuring the charge and discharge times, and converting those time elements with a formula, the resistance value of the resistive element can be determined. Because the resistance of the resistive element is uniquely related to temperature, the temperature can be uniquely determined.

As in the prior art, our invention also utilizes a thermistor-controlled multivibrator whose oscillation frequency is determined by the RC combination of the thermistor resistance and the value of the charging capacitor. However, the preferred embodiment contains several unique designs not introduced in the prior art. These designs provide novel means to (1) null out errors introduced by the non-ideal behavior of the multivibrator circuit and (2) vastly improve accuracy by nulling out undesirable temperature-induced effects within the passive and active circuit elements.

Our invention utilizes a CMOS 555 timer as the multivibrator circuit in the preferred embodiment. However, other oscillator designs might be used in other applications as well. For example, our method could be used with a bipolar, 5-volt 555 timer, when higher voltage power supplies would be available.

A first novel feature of the preferred embodiment of the first aspect of this invention is the determination of temperature through the measurement of the charge and discharge times of the sensor digital waveform. By measuring the ratio of the discharge time to the charge time, a sensor response may be obtained that is uniquely determined by the temperature that the sensor is in equilibrium with, e.g. body temperature, skin temperature, ambient temperature, etc.

A second novel feature of the preferred embodiment of the first aspect of this invention is to measure the cell constant of the sensor by substituting a precision fixed reference resistor in place of the temperature-dependent resistor, and measuring the response of the sensor when the fixed resistor is in place. All subsequent measurements of the sensor response when the temperature-dependent resistor is in place are normalized by the cell constant, thereby nulling out non-ideal effects of the astable multivibrator and the passive circuit elements that control the multivibrator frequency.

A third novel feature of the preferred embodiment of the first aspect of this invention is that the fixed reference resistor is a precise multiple value of the temperature-dependent resistor when the temperature-dependent resistor is stabilized at a characteristic temperature. For a thermistor, this characteristic temperature is known as the "reference temperature" and the resistance of the thermistor at the characteristic temperature is known as the reference resistance. Ideally, the multiple value is a positive integer and is preferably unity.

A fourth novel feature of the preferred embodiment of the first aspect of this invention is that the cell constant may be measured during assembly of the sensor by substitution of the reference resistor of known value instead of the temperature-dependent resistor and this process does not require the use of a temperature-stabilized immersion bath or chamber.

In accordance with the second aspect of the invention, a body temperature measurement system consists of a microcontroller-based measurement device which transmits body temperature data, and a body-worn receiving unit which interprets the transmission and displays the temperature.

The measurement device contains three electrical subsystems: a thermistor-controlled multivibrator sensor circuit, a low-power microcontroller, and a modulated transmitter. A precision thermistor provides a variable charge element for an integrated timer circuit connected in an astable multivibrator configuration. The multivibrator generates pulses whose duty cycle varies as the thermistor charge element varies. The pulses are counted by a low-power microcontroller, and converted by the same microcontroller to a digital number which is temporarily stored in memory. Once the digital number has been determined the microcontroller de-activates power to the multivibrator to conserve battery power.

Using its own clock and a seed value, the microcontroller calculates a pseudo-random number, and determines the commencement of the next data transmission. The microcontroller then constructs a data word consisting of the current reference clock value, the digital number from the multivibrator count, a unique serial number previously stored in the microcontroller during manufacturing, and an error detection number calculated from the other values in the data word. The data word is interleaved with very specific bit values, and attached to a preamble and sync word to create a data packet. When it is time for the next transmission, the microcontroller activates the RF transmitter, and begins sending the data packet to the modulation portion of the RF transmitter.

The RF transmitter consists of a crystal-stabilized oscillator which supplies a carrier frequency, and a variable capacitor which frequency modulates the carrier. Once it has been activated, the RF transmitter modulates the data packet from the microcontroller onto the carrier, and transmits the modulated carrier. After the data has been transmitted, the microcontroller de-activates the RF transmitter, and enters a sleep mode to preserve battery power. The microcontroller leaves sleep mode just prior to the next transmission, re-actives the multivibrator, and begins the temperature measurement cycle again.

The entire measurement device electronics are designed to operate from one or two silver-oxide batteries. The device and the batteries are packaged in a bio-compatible shell that can be swallowed.

The receiving unit contains three functional subsystems: data demodulator and interpreter, microcontroller with sensor-tracking and data conversion algorithms, and activation mechanism. The data demodulator consists of a radio which demodulates the carrier to data. An on-board microcontroller removes the interleaved bits and checks the error detection word to determine if the incoming data is uncorrupted by the RF channel. For intact data words, the microcontroller converts the digital number from the multivibrator count to temperature. The temperature and the serial number from the data word are displayed on an LCD, stored in on-board memory, and/or retransmitted to a remote station via a direct-wire connection or a secondary radio-frequency link.

The same pseudo-random algorithm used to determine the next transmission time in the transmitter is programmed into the receiving unit microcontroller. Using this algorithm, the receiver can predict when each sensor will transmit a data packet, and which sensor will be transmitting the data packet. If the receiving unit is displaced far enough from the measurement device that radio communication is lost, the receiver can still predict when that particular transmitter should be transmitting based on the algorithm.

For the pseudo-random algorithm to be initiated correctly, the receiving unit has an embedded activation mechanism. A cavity within the receiver's housing holds the measurement device capsule. The receiver's microcontroller pulses an IR LED contained within the cavity. An IR sensitive photodetector in the device capsule activates the capsule's microcontroller. Subsequent messaging from the receiver via the IR LED confirms the capsule's use and prompts a transmission from the measurement device. This first transmission from the measurement device contains the device's serial number, clock value, and a calibration value stored during manufacturing. The serial number identifies the device during all subsequent transmissions. Included in the serial number is a sensor identifier that indicates which type of physiological parameter the sensor measures. Feedback is provided to the user to indicate that the sensor has been identified and is operational. The temperature monitor system is able to support sensors of other physiological parameters (including but not limited to heart rate, blood pressure, $SPO_2$, etc.), behavioral parameters (such as activity, sleep, etc.), environmental conditions (such as temperature, motion, etc.), and detection conditions (such as concentration level of a toxic or other material of interest).

The clock value is used as part of the sensor-tracking algorithm, and the calibration value is used to convert the digital number from the multivibrator to temperature.

Using the on-board activation mechanism, several devices can be monitored by the same receiving unit, since each one has a unique serial number, and is given a different time sequence in the sensor-tracking algorithm.

A first novel feature of the preferred embodiment of the second aspect of this invention is the use of a multivibrator to convert the thermistor resistance to pulses with varying duty cycle, counting these pulses by an onboard microcontroller and storing a resulting value in memory as a digital number.

A second novel feature of the preferred embodiment of the second aspect of this invention is that a unique serial number is stored in the device microcontroller memory and is transmitted with the measured temperature number to specifically identify the device. The serial number contains a sensor identifier indicating which physiological (heart rate, blood pressure, temperature, etc.), behavioral, environmental, or detection parameter is being measured.

A third novel feature of the preferred embodiment of the second aspect of this invention is that the sensor/transmitter microcontroller determines when the next data transmission will be by calculating a pseudo-random number based on its own clock and a seed number. The same algorithm is contained in the receiving unit so that the receiver can predict when the next transmission will be from each device.

A fourth novel feature of the preferred embodiment of the second aspect of this invention is that the measured temperature number, the clock cycle, and the unique serial number are combined in a data word with an error detection number. This data word is encoded using bit stuffing, and combined with a preamble and sync word to form a data packet.

A fifth novel feature of the preferred embodiment of the second aspect of this invention is that the RF transmitter topology includes a mechanism for modulating the carrier. Further, the RF transmissions are periodic, rather than continuous, and are not started until the time calculated by the microcontroller.

A sixth novel feature of the preferred embodiment of the second aspect of this invention is that the microcontroller controls the activation of the multivibrator and the RF transmitter, and utilizes a sleep mode to minimize the average current draw on the battery. This allows the use of ultra-miniature silver-oxide batteries.

A seventh novel feature of the preferred embodiment of the second aspect of this invention is an activation mechanism utilizing an IR LED and an IR sensitive photodetector. The mechanism activates the microcontroller reset in the measurement device allowing it to be shelved for long periods before use. The IR communication link also enables the receiving unit to send instructions to the device, and prompt the device for information such as the serial number and calibration value. The IR communication link also enables the receiving unit to determine whether the sensor is operating within limits so that feedback may be provided to the user about the satisfactory operation of the sensor.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
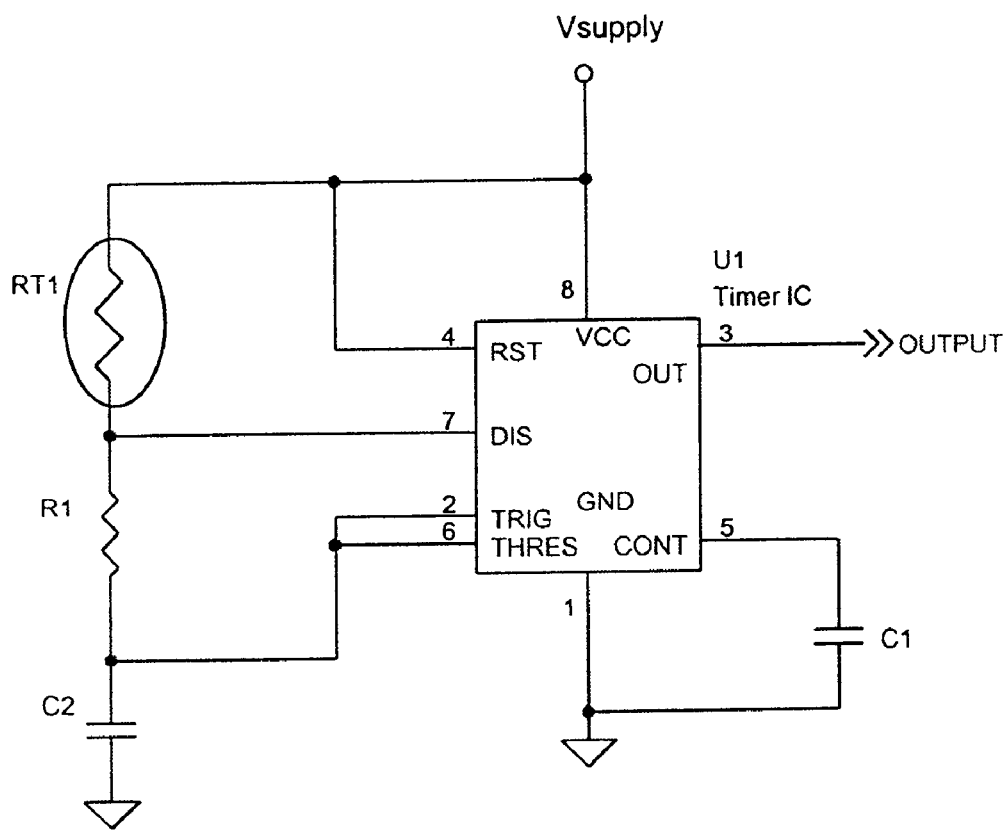
FIG. 1 is a schematic diagram of a temperature-sensitive circuit in accordance with the invention in its first aspect.

The temperature-sensitive circuit shown in FIG. 1 is a classical 555 timer circuit whose charge time is controlled by resistors $R_T$ and $R_1$ and a capacitor C2, and whose discharge time is controlled by the resistor $R_1$ and the capacitor C2. Classical 555 timer circuits use the external network to control the frequency, and various uses of 555 timers in transducers are well known.

Figure 2:
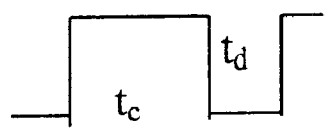
FIG. 2 is a graph that is useful in describing operation of the circuit shown in FIG. 1.

In one embodiment of the invention, $R_T$ is a precision thermistor having a resistance of approximately 100 kohm at 25° C., and $R_1$ is a 100 kohm precision fixed resistor. This will produce a 555 pulsed waveform whose charge time, $t_c$, is about twice the discharge time, $t_d$, as shown in FIG. 2.

As the temperature increases above 25° C., the thermistor resistance will decrease, since the thermistor has a negative temperature coefficient. The resulting waveform at temperatures higher than 25° C. will have decreased duty factor and higher frequency. Thus, the frequency and duty factor will be uniquely related to the ambient temperature. For low power operation, the resistance of the thermistor must be large, ideally 100 kohm at 25° C. If such a large value is not available, it may be necessary to add a series resistor Rs, such that RT=Rth+Rs, where Rth is the thermistor and RT is the total series resistance of Rth and Rs.

Instead of measuring frequency, we measure the system charge and discharge times. This is a time-domain, rather than a frequency-domain measurement. In this scheme, the charge time is given by the following general equation:

$$tc=AC_2 (RT+R1)=AC_2(Rth+Rs+R1)$$

and the discharge time is given by $$td=BC_2 (R1)$$

In these equations, A and B are factors dependent on the value of the capacitor C2 and other characteristics of the 555 timer.

For simplicity of design, it is convenient to choose Rs=n*R1, where n is an integer. In addition, it simplifies the design if a thermistor is chosen such that its resistance at its reference temperature is equal to R1. Then, noting that Rth is a temperature-dependent quantity, let Rth=θR1, where θ is a temperature-dependent function whose value is unity when the temperature is equal to the reference temperature of the thermistor. To eliminate the temperature dependencies in the capacitance and the active circuit elements, we form the ratio of tc to td:

$$\frac{t_c}{t_d} = \frac{AC2(R_{th} + R_s + R_1)}{BC2(R_1)} = \frac{A}{B}\left(1 + n + \frac{R_{th}}{R_1}\right)$$

We refer to the constant A/B as the cell constant $\mu$.

The ratio is designated by the Greek letter "gamma" and we refer to this function as the sensor equation, $$\gamma(T) = \mu\left(1 + n + \frac{R_{th}}{R_1}\right) = \mu[1 + n + \Theta(T)]$$

For medical thermistors, the reference temperature is usually 25° C. At this reference temperature, T=T0=25° C., θ=1 and γ=γ0 and the previous equation reduces to γ0=$\mu$[2+n].

For an ideal 555 timer, $\mu$=ln(2)=0.69 as a theoretical value. However, actual integrated circuit versions of the 555 timer, in particular the CMOS timer for low power applications, may not have $\mu$=0.69 exactly, and in order for this method to be highly accurate, the value of $\mu$ must be determined. In principle, if we measure the value of tc/td at the reference temperature, 25° C., we can determine the cell constant $\mu$ from the equation $$\mu = \frac{\gamma_0}{2 + n}$$

as long as the value of the thermistor at its reference temperature is identically equal to R1. In practice, this is easy, because there are several manufacturers of medical grade thermistors whose reference temperature resistances are available in various values with a very narrow tolerance. Also, fixed precision resistors are available whose actual values can be as close as 0.1% to their nominal value.

A more direct method to determine the cell constant very accurately is to substitute a fixed resistor in place of the thermistor. The value of this fixed resistor should be equal to the value of the thermistor at its reference temperature, and the same as the value of R1. This substitution simulates the thermistor resistance at 25° C. When the fixed resistor is substituted for the thermistor, the sensor equation becomes $$\gamma(T_0) = \mu_0[1+n+\Theta(T)] = \mu_0[1+n+1] = \mu_0[2+n]$$

Thus, the cell constant is equal to the measured value of the td/tc ratio divided by (2+n). Once the cell constant is measured, the fixed resistor is removed and the thermistor is installed. This measurement need only be done once, when the cell is constructed, and this process can be easily automated with the use of a personal computer and a miniature probe set. Once the cell constant is known, it can be stored in memory on board the sensor microcontroller.

For actual temperature measurements, the cell equation can be inverted to provide the thermal function θ(T). The thermal function at a temperature T is the ratio of the thermistor resistance at the temperature T to the thermistor resistance at its reference temperature, 25° C. We have, $$\Theta(T) = \frac{\gamma(T)}{\mu} - (1 + n)$$

In the preferred embodiment of the thermometer, the sensor network is combined with a microcontroller circuit to form the miniature thermometer. The size of this thermometer is made to be as small as possible so that it can fit into an ingestible pill for measuring body core temperature, in a small skin patch for measuring skin temperature, in a capsule that can be placed in a body orifice, such as the ear canal, or implanted elsewhere in a human or animal subject, or in the form of a small transmitter for use in measuring ambient temperature. During the manufacturing process, the circuit is first assembled, and a fixed resistor is fitted in place of the thermistor. An external probe set is used to turn on the sensor and record the tc and td values when the fixed resistor is in place. From these values, an external computer (personal computer) is used to calculate the cell constant. The external PC then programs the value of the cell constant into the microcontroller on board the sensor. When this process is complete, the fixed resistor is removed and the thermistor is installed. From this point on, when the thermometer circuit is activated, the microcontroller measures tc and td and calculates the temperature using the cell constant.

For a thermistor, the thermal function is uniquely related to the temperature via the Steinhart-Hart equation:

$$\frac{1}{T} = a + b\ln(R) + c[\ln(R)]^3$$

whose coefficients a, b, and c are constants and characteristic of the material used to manufacture the thermistor. For highest accuracy, a medical-grade thermistor is used whose coefficients are very accurately known and provided by the supplier of the thermistor.

In actual implementations, it may be possible that the temperature cannot be derived from the thermistor resistance via the Steinhart-Hart equation. This is because the circuit may have thermal characteristics that lead to deviations from the Steinhart-Hart curve fit. It is still possible to obtain a temperature function that relates the thermistor resistance Rth to the temperature T over a wide range of temperatures. By making the definition, $$R_e = \frac{R_{th}}{R_1}$$

Re is the "effective resistance" of the thermistor, relative to its value at the reference temperature, 25° C. (because Rth(25)=R1). For temperatures greater than 25° C., Re is less than unity. For temperatures less than 25° C., Re is greater than unity. This is because Rth has a negative temperature coefficient. We have found that a polynomial function of the form $$T(R_e) = A_0 + A_1 R_e + A_2 R_e^2 + A_3 R_e^3 + A_4 R_e^4 + A_5 R_e^5$$

is sufficient to relate the temperature to the effective resistance of the thermistor over a wide range of temperatures. Accordingly, we calculate temperature based on this polynomial rather than the Steinhart-Hart equation.

In a practical implementation, the thermometer is able to measure temperature over a 100 C. range, e.g. from −30° C. to +70° C., with a good level of accuracy and resolution.

Figure 3:
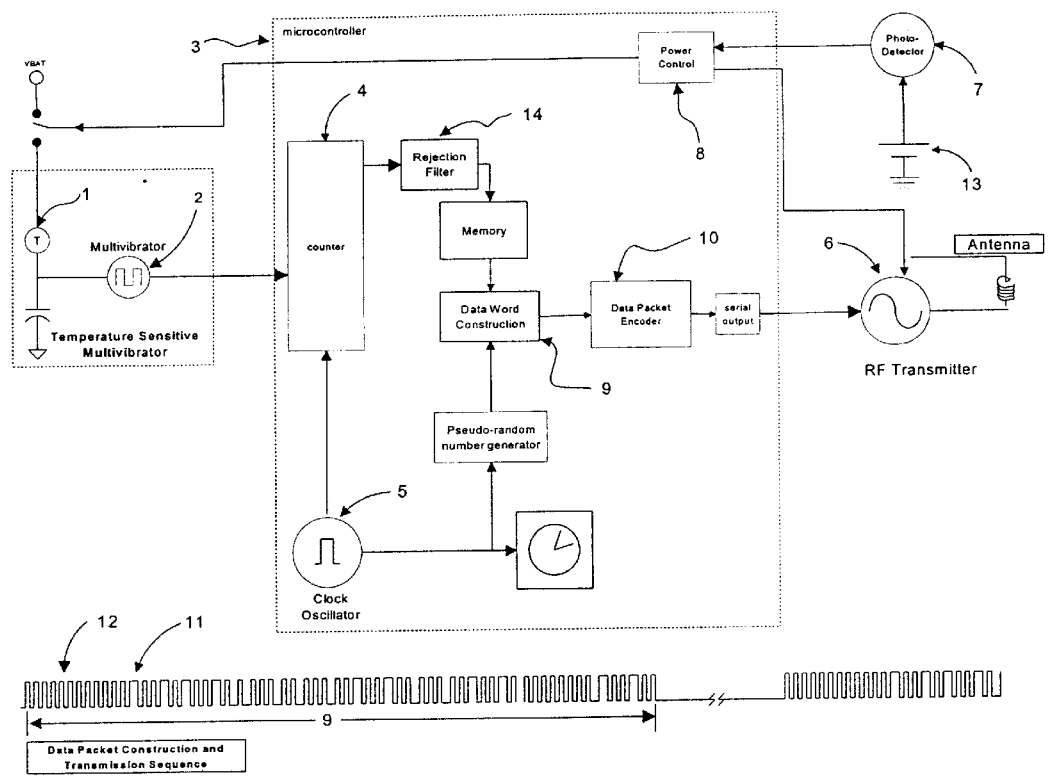
FIG. 3 is a block diagram showing the architecture of the electronic components contained within the transmitter unit of a temperature measurement device in the preferred embodiment of the invention in its second aspect.

A block diagram showing the architecture of the electronic components of the transmitter unit of a temperature measurement device in accordance with the second aspect of the invention is shown in FIG. 3. The electronics include a precision thermistor 1 connected as a variable charge element for the multivibrator 2; a microcontroller 3 containing a counter-timer 4, clock oscillator 5, data inputs and outputs 10, a window rejection filter 14, and power control input/outputs 8; an IR sensitive photodetector 7, and an RF transmitter containing a modulator and antenna 6.

The multivibrator may include a 555 timer connected to the thermistor 1 and the capacitor in the manner described with reference to FIG. 1. The output of the multivibrator OUTPUT is connected to the input port of the microcontroller's counter-timer circuitry. The microcontroller timer-counter counts the number of clock cycles during a discharge cycles and the number of clock cycles during an adjacent charge cycle, and stores these two numbers. The count for the discharge cycle is compared to the limits of a window rejection filter. If the count for the discharge cycle is above or below the window filter limits, it is rejected along with the corresponding count for the charge cycle. This rejection filter eliminates spurious counts caused by mistriggering of the timer-counter. If the count for the discharge cycle is within the window filter limits, it is divided by the corresponding count for the charge cycle, and a tally of the number of samples is incremented by one. The ratio of the discharge:charge counts is then stored in memory to start a running total. The process of counting the clock during discharge and charge cycle is repeated a fixed number of times, with each pair of counts being either rejected, or divided and the ratio added to the running total in memory. When the counting process has been completed, the running total of the ratios is divided by the number of samples tally, giving the average ratio of discharge:charge counts for that sample period. The average ratio is collected for several sample periods, and these values are also averaged, resulting in a final ratio of discharge:charge counts that has very little noise. The final ratio value is stored as a digital number in the microcontroller memory until the time it is transmitted.

During the calibration process, a precision resistor is used in place of the thermistor Rth. The average ratio of discharge:charge counts is determined by the same procedure described in the previous paragraph and is stored in the microcontroller memory as a calibration value.

During manufacture, a unique serial number is also stored in the microcontroller memory.

To avoid cross-talk with nearby devices, the microcontroller uses a pseudo-random algorithm to determine when the next transmission will be. Future time is divided into 1 minute tick marks consisting of a 48 second 'active' interval, and a 12 second 'guard' interval. The 12 second guard interval buffers each active interval, providing time-lapse between consecutive transmissions. Each 48 second active interval is divided into 256 transmission slots, with each slot being defined by a specific time point. Within the 48 second active interval, a specific time point is calculated based on a pseudo-random number generation (PNG) function. The PNG function is based on a polynomial of form $p(x)=X^{24}+x^4+x^3+x+1$. The random number is generated by a program loop that constructs an array of 1s and 0s based on the polynomial p(x), the seed value, the number of elapsed tick marks and the number of bits used for the time point (eight in the case of this example, where there are 256 transmission slots). The initial seed value is different for each device, and a new seed value is produced along with the random bits for each passing tick mark. The result is that the successive transmissions take place in a predictable, random series of transmission slots.

Referring back to FIG. 3, a clock oscillator 5 integrated in the microcontroller provides the pseudo-random algorithm with a reference time. The time point from the pseudo-random algorithm is used to calculate the value of the reference clock when the next transmission is to occur.

Just prior to the time of the next transmission, the microcontroller activates the multivibrator temperature measurement routine. After the measurement, the microcontroller deactivates the multivibrator and constructs a data word 9 consisting of: the transmission time point; the serial number of the device previously stored in memory during the manufacturing process; the digital number from the multivibrator; and an error detection byte. The serial number of the device contains a sensor identifier indicating that it is a temperature sensor. The sensor identifier distinguishes whether the sensor is a thermometer or another physiological sensor (such as a heart rate sensor), or a sensor of another parameter or condition, as described above. The error detection byte is calculated using a cyclic redundancy code (CRC) algorithm and is based on the digital number, the serial number of the device, and the transmission time point and the calibration value. The data word is encoded 10 by interleaving a 4b/8b bitstuff table to balance the number of 1's and 0's sent to the RF Transmitter 6. The encoder also attaches a preamble 12 and a synchronization word 11 to the front of the data packet. The receiving unit uses the preamble to lock onto the carrier frequency.

Figure 4:
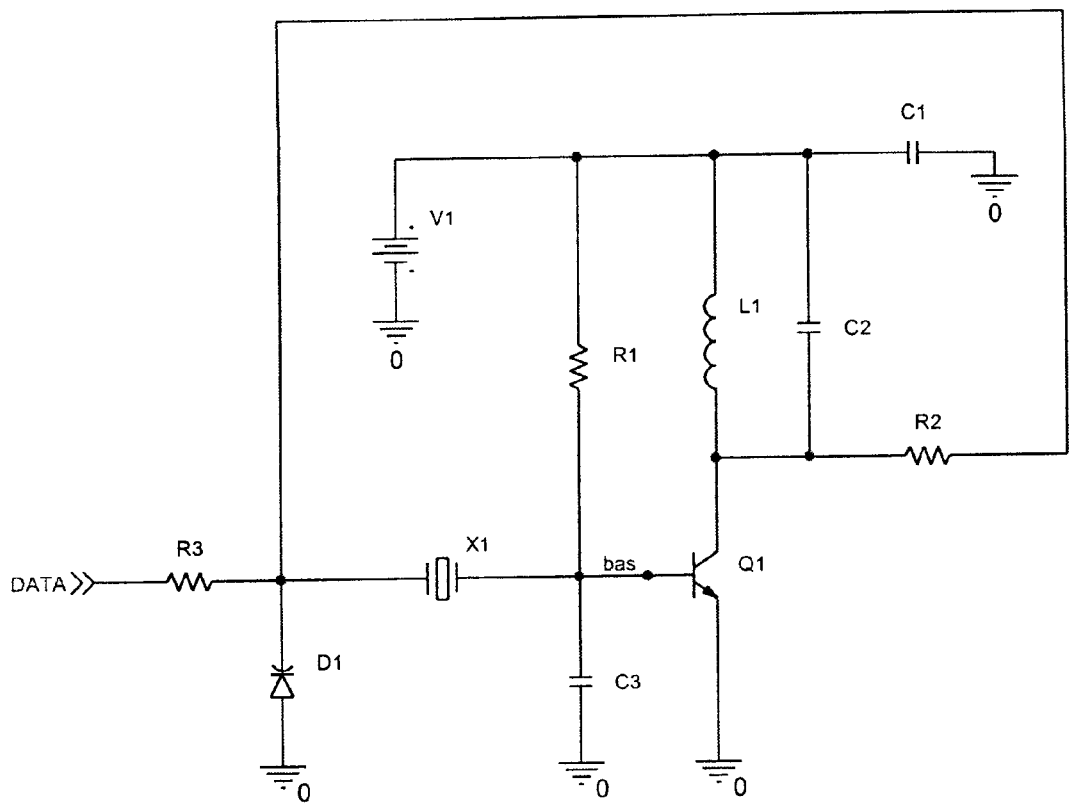
FIG. 4 is a circuit schematic of the RF transmitter circuit included in the transmitter unit.

Once the data packet has been constructed, the microcontroller activates the RF transmitter. FIG. 4 shows a schematic of the RF transmitter.

The transmitter is a Pierce oscillator configuration (U.S. Pat. No. 1,789,496) with X1, D1, C3 being the resonator and Q1, L1, and C2 being the amplifier. The applicants have chosen a fundamental crystal for X1 to stabilize the carrier of the transmitter to ±100 ppm. The inductor L1 acts as the antenna. Capacitor C2 forms a tank circuit with L1, boosting the output power from the transmitter. Resistor R2 provides additional phase shift to ensure stable oscillations and isolate the tank circuit from the resonator. Data from the microcontroller frequency modulates the carrier by altering the voltage on the varactor D1, which in turn varies the resonant frequency of the resonator. The result is a frequency-shift keyed carrier. Alternate embodiments could directly alter the voltage on the base or collector of Q1, resulting in amplitude-shift keying or on-off keying. The topology of the RF transmitter lends itself to operation from either 1.5V or 3V battery V1.

Referring to FIG. 3, to allow the device to be shelved for an extended period before use, an IR-sensitive photodetector 7 is used as an activation switch. The applicants have chosen a phototransistor as the photodetector, although alternative embodiments could use a photodiode. The phototransistor is connected to the reset pin and one of the input ports of the microcontroller, which controls power to the multivibrator, and the RF transmitter. During activation, the device capsule is lodged in a cavity on the receiving unit where it is in close proximity to an IR LED. When the phototransistor senses enough light, it triggers the reset of the microcontroller, activating the clock 5, and initiating a wake-up routine. The microcontroller then waits for a predetermined message from the receiving unit sent via the IR link. If the message is not received within a pre-allotted time, the microcontroller re-enters sleep mode. If the message is received, the RF transmitter is activated, and the calibration value stored in the microcontroller memory, the device serial number, and the current clock count are sent via the RF transmitter. In this way, the receiving unit and the temperature measurement device are synchronized, and contain the same seed value. The receiving unit can use the seed value and the device clock as inputs to the PNG function to determine the expected time of the next transmission even when RF communication has been lost. The device completes the activation process by transmitting a sample data packet with a predetermined temperature number, and beginning the measurement routine.

If any of the communication during the activation process, including the sample data packet, is missing or corrupted, the receiving unit displays a warning to the user indicating the device is not operating and a possible course of action.

Figure 5:
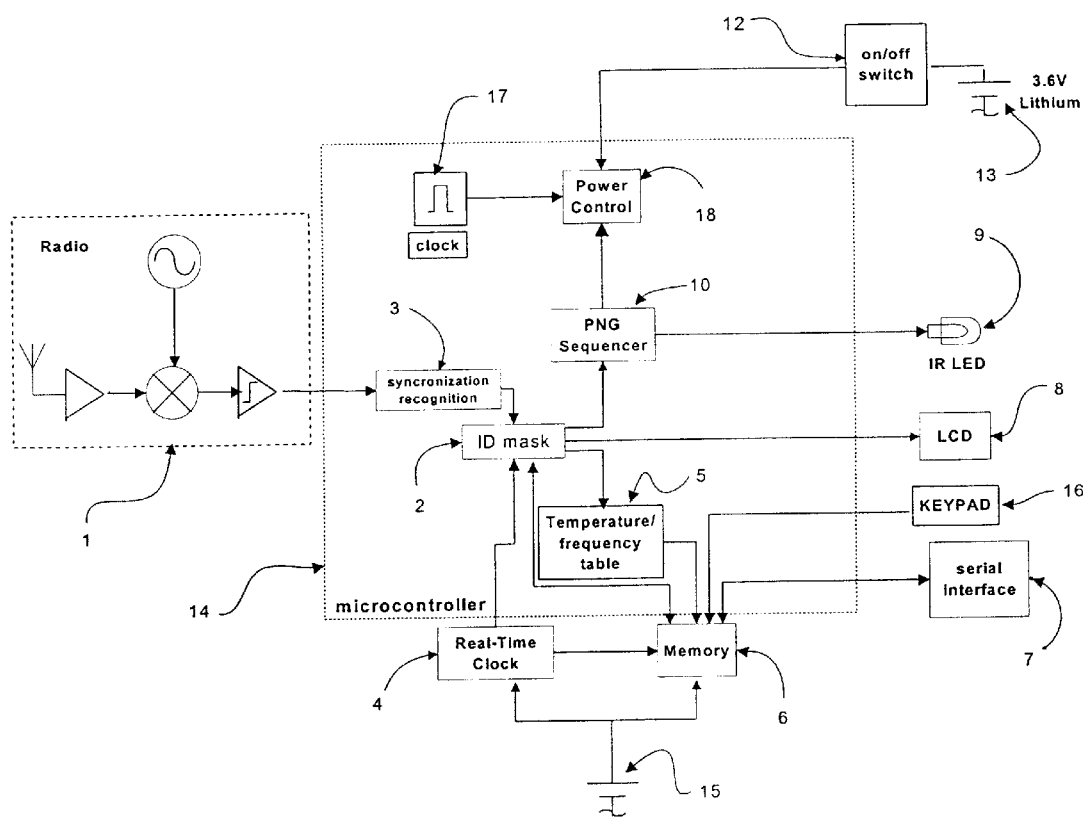
FIG. 5 is a block diagram showing the architecture of the electronic components contained within the receiving unit of the temperature measurement device.

FIG. 5 shows a block diagram of the receiving unit's functions. The microcontroller 14 activates the superheterodyne radio 1, which receives the signal from the temperature measurement device and demodulates the data. Once the complete data packet is received and stored in memory, the receiver radio 1 is de-activated by the microcontroller 14. The microcontroller uses the synchronization word in the data packet as a start indicator, then removes the interleaved bits from the data word 3. The error detection byte is then checked to ensure the data word is valid. Invalid data words are rejected. An ID mask function 2 compares the serial numbers from valid transmissions to a list of the serial numbers of devices initialized by the receiver. Sensor data streams with serial numbers that do not match are ignored. The multivibrator digital numbers of sensor data streams with matching serial numbers are used to calculate values of effective resistance using the calibration value stored during initialization and the effective resistance is converted to temperature values based on the polynomial function for T(Re). The temperature is stored in memory 6 along with a time stamp from the real-time clock 4. Whenever available, the new temperature data is displayed on the LCD 8. The keypad 16 is used to change device options, perform initialization, enter user data, and execute other system functions. The temperature data can be retrieved from memory later using the serial interface 7 and a PC, or transmitted to a remote station via a direct connection or a secondary radio frequency link.

The PNG sequencer 10 uses the microcontroller clock 17 to track the transmission intervals for several individual sensing devices, which may be temperature sensitive devices but may alternatively be sensitive to other parameters. The same pseudo-random algorithm programmed into each sensing device is programmed into the PNG sequencer. Using the pseudo-random algorithm, and the seed values transferred from the sensing devices, the PNG sequencer can predict when the next transmission will be, and which sensing device will be transmitting. Just prior to the next expected transmission, the receiver radio 1 is activated by the microcontroller.

A push button, which may be part of the keypad 16, begins the activation of a new temperature measurement device (or other sensing device). During the activation routine, the microcontroller sends a message to the temperature measurement device via the IR LED 9. After a short delay, the microcontroller 14 requests the calibration value and serial number of the device using the same IR LED. The radio 1 is activated, and receives the transmitted message from the temperature measurement device. The PNG sequencer 10 uses the serial number to calculate a unique seed value, and outputs the seed to the temperature measurement device via the IR LED. The device responds with a predetermined data packet. The receiving unit verifies the validity of the data packet. The validity (or invalidity) of the data packet is displayed on the LCD 8.

A power switch 12, which may have an actuation element on the keypad 16, allows the main battery 13 to be preserved when the receiving unit is shelved. A back-up battery 15 preserves the real-time clock setting and data volatile memory while the main battery 13 is exchanged.

In summary, a preferred embodiment of the second aspect of the invention is a thermometer for the purpose of measuring body temperature or other physiological parameters, behavioral parameters, environmental conditions, etc. The thermometer consists of a microcontroller-based temperature measurement device which acquires and transmits body temperature data, and a receiving unit which may be worn by the subject and interprets the data and displays the temperature.

The measurement device contains three electrical subsystems: a thermistor-controlled multivibrator sensor circuit, a low-power microcontroller, and a modulated VHF transmitter. The electronics operates from two silver-oxide batteries, and is small enough to fit within an ingestible biocompatible shell. The transmissions from the device are periodic, and follow a specific pattern to reduce cross-talk between individual devices.

The receiving unit demodulates the data from the measurement device, and converts it to temperature data using a specific calibration value. The temperature is displayed digitally on an LCD display and is stored in memory.

The thermometer includes an activation mechanism which allows the device to be shelved for long periods without draining the battery. The receiving unit contains an infrared (IR) light emitting diode (LED) and a cavity for holding the measurement device. The measurement device contains an IR sensitive phototransistor which is activated by the IR LED on the receiving unit when placed in the cavity. A message from the receiving unit initiates the microcontroller in the measurement device, and activates the multivibrator sensor circuit.

It will be appreciated that the invention is not restricted to the particular embodiment that has been described, and that variations may be made therein without departing from the scope of the invention as defined in the appended claims and equivalents thereof. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

What is claimed is:

1. A thermometer comprising a multivibrator including a capacitor having first and second conductive paths associated therewith, one of said first and second paths being a charge path for the capacitor and the other of said first and second paths being a discharge path for the capacitor, the multivibrator also including at least first and second resistors wherein the first and second resistors are connected in said first path, and the first resistor, but not the second resistor, is connected in said second path, and wherein the first resistor has a resistance value that is substantially independent of temperature and the second resistor has a resistance value that varies with temperature and is a function of temperature.

2. A thermometer according to claim 1, wherein the multivibrator includes a third resistor having a resistance value that is substantially independent of temperature and is substantially equal to an integer multiple of the resistance value of the first resistor, and wherein the first, second and third resistors are connected in series in said first path and the first resistor, but not the second or third resistor, is connected in said second path.

3. A thermometer according to claim 1, wherein the resistance value of the second resistor at a reference temperature thereof is substantially equal to the resistance value of the first resistor.

4. A thermometer according to claim 1, wherein the multivibrator includes a type 555 timer circuit.

5. A thermometer according to claim 1, wherein said first path is the charge path and said second path is the discharge path.

6. A method of manufacturing a thermometer, comprising:
providing a multivibrator including a capacitor having first and second conductive paths associated therewith, one of said first and second paths being a charge path for the capacitor and the other of said first and second paths being a discharge path for the capacitor, the multivibrator also including at least first and second resistors wherein the first and second resistors are connected in said first path, and the first resistor, but not the second resistor, is connected in said second path, and wherein the first and second resistors have respective resistance values that are substantially independent of temperature,
measuring charge and discharge times of the capacitor and calculating a reference value of a cell function based on said charge and discharge times, and
replacing the second resistor with a temperature-dependent resistor.

7. A method according to claim 6, further comprising:
establishing thermal equilibrium between the temperature-dependent resistor and a region at a temperature to be measured,
measuring charge and discharge times of the capacitor and calculating a second value of the cell function, and
calculating a temperature value based on the reference value of the cell function and the second value of the cell function.

8. A method according to claim 6, further comprising recording the reference value of the cell function.

9. A method according to claim 8, further comprising recording additional values of the cell constant.

10. A method of manufacturing a thermometer, comprising;
providing a multivibrator including a capacitor having first and second conductive paths associated therewith, one of said first and second paths being a charge path for the capacitor and the other of said first and second paths being a discharge path for the capacitor, the multivibrator also including at least first and second resistors wherein the first and second resistors are connected in said first path and the first resistor, but not the second resistor, is connected in said second path, and wherein the first resistor has a resistance value that is substantially independent of temperature and the second resistor has a resistance value that varies with temperature and is a function of temperature, the resistance value of the second resistor at a reference temperature being substantially equal to the resistance value of the first resistor,
measuring charge and discharge times of the capacitor at the reference temperature and calculating a value of a cell function, and
recording the value of the cell function.

11. A thermometer comprising:
a multivibrator including a capacitor having first and second conductive paths associated therewith, one of said first and second paths being a charge path for the capacitor and the other of said first and second paths being a discharge path for the capacitor, the multivibrator also including at least first and second resistors wherein the first and second resistors are connected in said first path, and the first resistor, but not the second resistor, is connected in said second path, and wherein the first resistor has a resistance value that is substantially independent of temperature and the second resistor has a resistance value that varies with temperature and is a function of temperature,
a means for measuring duration of the charge time and duration of the discharge time of the capacitor and calculating the ratio of the discharge time to the charge time, and
a means for transmitting said ratio to a receiver for calculating a corresponding temperature value.

12. A device for measuring temperature, comprising a pulse generator including a resistor such that the pulse generator generates pulses of duty cycle dependent on the resistance of the resistor, and a duty-cycle measurement circuit for measuring the duty cycle of the pulses and outputting a value dependent on the measured value of the duty cycle, and wherein the resistor has a non-zero temperature coefficient of resistance.

13. A device according to claim 12, comprising a means for storing a unique serial number of the device and a means for combining the serial number of the device with the measured value of the duty cycle to generate an output data word.

14. A device according to claim 12, comprising a means for storing a unique serial number of the device, a means for calculating an error detection number, and a means for combining the serial number of the device with the measured value of the duty cycle and the error detection number to generate an output data word.

15. A device according to claim 12, including a means for resolving future time into a succession of transmission intervals and for resolving each transmission interval into a plurality of transmission slots, a means for calculating a pseudo-random number based on a predetermined algorithm, a means for selecting one of said transmission slots based on the calculated pseudo-random number, and a means for transmitting said value during the selected transmission slot.

16. A device according to claim 15, in combination with a receiver that includes a means for calculating said pseudo-random number based on said predetermined algorithm, whereby the receiver is able to predict the time of transmission of said value.

17. A device according to claim 12, comprising a means for generating a data word based on said measured value, said device being in combination with an RF transmitter for modulating a carrier in accordance with said data word and a means for operating the RF transmitter in periodic fashion.

18. A device according to claim 12, including a means for controlling activation of the pulse generator.

19. A device according to claim 12, wherein the pulse generator is a multivibrator including a capacitor and the resistor is connected in charging or discharging relationship with the capacitor.

20. A measurement system, for measuring the value of a parameter, comprising:
a transmitter unit that includes a sensor device for sensing the parameter, a transmitter device, a photodetector, and a controller, and
a receiver unit that includes a light emitting device that can be energized to emit an activation signal and a confirmation signal, and wherein the photodetector delivers the activation signal and the confirmation signal to the controller, and the controller is responsive to the activation signal to initiate activation of the transmitter unit and is responsive to the confirmation signal within a predetermined interval after the activation signal to complete activation of the transmitter unit.

21. A measurement system according to claim 20, wherein the transmitter unit includes a confirmation means operative in response to the transmitter unit completing activation to drive the transmitter device to transmit a signal that includes a code that identifies the transmitter unit, and the receiver unit includes a means for receiving the identifying code.

22. A measurement system according to claim 21, wherein the signal transmitted by the transmitter device includes a signal element for synchronizing operation of the transmitter unit and the receiver unit.

23. A measurement device according to claim 20, wherein the transmitter unit includes a measurement device responsive to the sensor device to measure the value of the parameter and the signal transmitted by the transmitter device is encoded with the measured value of the parameter.

24. A measurement system comprising a transmitter for receiving data representing a value of a parameter and transmitting said value, and a receiver for receiving the transmission from the transmitter, wherein the transmitter includes a means for resolving future time into a succession of transmission intervals and for resolving each transmission interval into a plurality of transmission slots, a means for calculating a number based on a predetermined algorithm, a means for selecting one of said transmission slots based on the calculated number, and a means for transmitting said value during the selected transmission slot, and wherein the receiver includes a means for predicting when the transmitter will transmit said value and for enabling the receiver to receive the transmission from the transmitter during said selected transmission slot.

25. A measurement system according to claim 24, wherein said means for calculating calculates a pseudo-random number and the means for predicting calculates the same pseudo-random number based on said predetermined algorithm.

26. A measurement system according to claim 24, wherein said means for calculating calculates said number based on a seed value.

27. A measurement system according to claim 24, including at least first and second sensitive devices providing data representing respective values to the transmitter, and the means for calculating calculates first and second different numbers based on said predetermined algorithm.

28. A measurement system according to claim 27, wherein first and second identification numbers are associated with the first and second sensitive devices respectively, said means for calculating calculates said first and second numbers based on first and second seed values respectively, and said first and second seed values are related to said first and second identification numbers respectively.

29. A measurement system according to claim 27, wherein said first and second sensitive devices are sensitive to different respective parameters.

30. A measurement system according to claim 29, wherein at least one of said parameters is temperature.

31. A measurement system according to claim 24, wherein said parameter is temperature.

32. A measurement system according to claim 24, wherein the transmitter includes an RF circuit and the transmitter further includes a controller that activates the RF circuit intermittently, during said selected transmission slots.

33. A measurement system according to claim 24, including a sensitive device for providing said data to the transmitter, and wherein the controller activates the sensitive device periodically.

34. A measurement system, for measuring the value of physiological parameter, comprising:
a transmitter unit that includes a sensor device for sensing the physiological parameters a transmitter device, and a photodetector the transmitter unit having an active state, in which the sensor device generates a sensor signal having a characteristic that depends on the physiological parameter and the transmitter device emits a transmitter signal that depends on the characteristic of the sensor signal, and the transmitter unit also having an inactive state, and
a receiver unit that includes a light emitting device, and wherein the light emitting device of the receiver unit can be energized when the transmitter unit is in the inactive state to emit an activation signal and a confirmation signal and the photodetector is responsive to the activation signal to initiate activation of the transmitter unit and is responsive to the confirmation signal within a predetermined interval after the activation signal to complete activation of the transmitter unit.

35. A measurement system according to claim 34, wherein the transmitter unit includes a measurement device that measures a value of the characteristic of the sensor signal and generates a measurement signal that depends on the measured value of the characteristic, and the transmitter device receives the measurement signal.

* * * * *

UNITED STATES PATENT AND TRADEMARK OFFICE
CERTIFICATE OF CORRECTION

PATENT NO. : 6,629,776 B2
DATED : October 7, 2003
INVENTOR(S) : Florian G. Bell et al.

It is certified that error appears in the above-identified patent and that said Letters Patent is hereby corrected as shown below:

<u>Column 16,</u>
Lines 26 and 27, "parameters a transmitter device, and a photodetector" should be deleted and replaced with -- parameter, a transmitter device, and a photodetector, --

Signed and Sealed this

Eighteenth Day of November, 2003

JAMES E. ROGAN
*Director of the United States Patent and Trademark Office*